United States Patent
Pietrowicz et al.

(10) Patent No.: US 8,171,283 B2
(45) Date of Patent: May 1, 2012

(54) VEHICLE SEGMENT CERTIFICATE MANAGEMENT USING SHORT-LIVED, UNLINKED CERTIFICATE SCHEMES

(75) Inventors: Stanley Pietrowicz, Freehold, NJ (US); Giovanni Di Crescenzo, Madison, NJ (US); Robert G. White, Morristown, NJ (US); Tao Zhang, Fort Lee, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 984 days.

(21) Appl. No.: 12/051,309

(22) Filed: Mar. 19, 2008

(65) Prior Publication Data

US 2008/0232595 A1    Sep. 25, 2008

Related U.S. Application Data

(60) Provisional application No. 60/918,742, filed on Mar. 19, 2007.

(51) Int. Cl.
*H04L 29/06* (2006.01)
(52) U.S. Cl. .......... 713/156; 713/158; 713/175; 726/10; 380/30; 380/285; 368/6; 705/71
(58) Field of Classification Search .................. 713/156, 713/158, 175; 726/10; 380/30, 285; 368/6; 705/71
See application file for complete search history.

(56) References Cited

U.S. PATENT DOCUMENTS

| | | | |
|---|---|---|---|
| 6,948,061 B1 * | 9/2005 | Dierks | 713/159 |
| 7,017,046 B2 * | 3/2006 | Doyle et al. | 713/178 |
| 7,165,174 B1 | 1/2007 | Ginter et al. | |
| 2001/0049786 A1 * | 12/2001 | Harrison et al. | 713/156 |
| 2004/0003229 A1 * | 1/2004 | Reinold et al. | 713/155 |
| 2005/0125669 A1 | 6/2005 | Stewart et al. | |
| 2006/0174122 A1 | 8/2006 | Falch et al. | |

OTHER PUBLICATIONS

International Telecommunication Union, X.509 Information technology—Open Systems Interconnection—The Directory: Public-key and attribute certificate frameworks, Aug. 2005, pp. 15-16, 91.*
International Search Report, dated Aug. 4, 2008 (2 pages).

* cited by examiner

*Primary Examiner* — April Shan
(74) *Attorney, Agent, or Firm* — Philip J. Feig

(57) ABSTRACT

The present invention advantageously provides a system and method for management of cryptographic keys and certificates for a plurality of vehicles. Each vehicle of the plurality of vehicles generates public/private key pairs, requests multiple time-distributed certificates, creates an encrypted identity, and surrenders expired certificates. An assigning authority receives the public/private key pairs, the request for multiple time-distributed certificates, the encrypted identity, and the expired certificates from said vehicle. The assigning authority authorizes the vehicle with an authorizing authority, validates the expired certificates, proves ownership, and distributes the requested time-distributed certificates to said vehicle. Validation can comprise checking expired certificates against misused, compromised and/or previously surrendered certificates. Time-distributed certificates can have lifetimes adjustable based on certificate misuse detection system algorithms, amount of malicious activity detected, and/or certificate authority capacity.

20 Claims, 3 Drawing Sheets

VEHICLE SEGMENT CERTIFICATE MANAGEMENT USING SHORT-LIVED, UNLINKED CERTIFICATE SCHEMES

CROSS REFERENCE TO RELATED APPLICATION

The present invention claims the benefit of U.S. provisional patent application 60/918,742 filed Mar. 19, 2007, the entire contents and disclosure of which is incorporated herein by reference.

This application is related to commonly-owned, co-pending U.S. patent application Ser. No. 12/012,454 filed on Feb. 1, 2008, the entire contents and disclosure of which is expressly incorporated by reference as if fully set forth herein.

This application is related to the following commonly-owned, co-pending United States patent application filed on even date herewith, the entire contents and disclosure of which is expressly incorporated by reference as if fully set forth herein. U.S. patent application Ser. No. 12/051,241, for "VEHICLE SEGMENT CERTIFICATE MANAGEMENT USING SHARED CERTIFICATE SCHEMES".

FIELD OF THE INVENTION

The present invention relates generally to vehicle segment certificate management. In particular, the invention relates to the anonymous cryptographic key and certificate management process.

BACKGROUND OF THE INVENTION

Defining a method for managing anonymous certificates for vehicle communications networks, such as the Vehicle Infrastructure Integration (VII) system, is a very difficult, complex, and multi-faceted technical challenge. A significant part of this challenge is to protect vehicle privacy, i.e., secure vehicle communications so that the source remains anonymous and messages cannot be linked to one another. At the same time, misbehaving vehicles and attackers need to be detected and removed from the system. Traditional certificate management techniques are unacceptable because they use certificates that can readily identify the user and do not preserve vehicle privacy. No anonymous certificate method proposed to date has completely satisfied all design goals. Each offers a different balance of competing and intricately inter-related objectives, which include vehicle privacy, system security, system scalability, system robustness, vehicle segment maintenance, low complexity, practical implementation and ubiquitous operation.

Various categories of approaches for the management of anonymous keys and certificates are known. One popular category includes combinatorial certificate schemes that are shared-key approaches where each vehicle uses a small number of keys and certificates that are drawn randomly from a shared pool of keys and certificates. The keys in the pool can be created by a key-generation algorithm. Privacy is achieved because each key and certificate is shared by many vehicles. However, the balance among scalability, privacy, and performance in this category is limited.

The main operations in the anonymous certificate management process are 1) testing, 2) initialization, 3) selection and rotation, and 4) revocation and replacement of anonymous keys and certificates. Testing of anonymous keys and certificates can be performed by both vehicle suppliers and vehicle original equipment manufacturers (OEMs) to ensure the correct functioning of the key and certificate generation software and hardware components.

Initialization of anonymous keys and certificates involves the interaction between vehicles, vehicle dealers, and vehicle OEMs to allow vehicles to obtain their initial sets of live anonymous keys and certificates. Once a vehicle is initialized with its long-lasting keys and certificates, such as the 1609.2 CSR certificates, the vehicle can use these long-lasting keys and certificates to acquire initial anonymous keys and certificates in the same manner as it will acquire subsequent anonymous keys and certificates.

Selection and rotation of anonymous keys and certificates includes procedures used by each vehicle to select the anonymous keys and certificates to use and to decide how and when to rotate (change) the anonymous certificates each vehicle uses.

Revocation and replacement of anonymous keys and certificates determines which anonymous certificates should be revoked, revoking these certificates from the vehicles and the VII or other vehicle network system, and providing new keys and certificates to replace the revoked keys and certificates on the vehicles. However, certificate revocation and replacement methods in the basic combinatorial certificate schemes have several crucial limitations that need to be overcome. First, they cannot support a moderate to high number of attackers. Second, they will result in unpredictable and uncontrollable probability distributions of certificates among vehicles, resulting in unpredictable and uncontrollable system scalability and performance. Third, they are missing some necessary methods to ensure the continuous operation of the certificate management system. For example, they use a fixed rekey threshold to determine which vehicles should no longer be allowed to receive new anonymous certificates, but do not provide a method for decrementing or resetting the rekey counters.

Combinatorial certificate management schemes exhibit a fundamental weakness, known as the "one affects many" problem. The "one affects many" problem refers an inherent attribute of shared certificate schemes where a threat to a certificate held by one vehicle is amplified by the sharing of keys and affects a large number of vehicles. In particular, the "one affects many" problem manifests itself in the following ways:

1. A large number of innocent vehicles are impacted when a certificate is revoked
2. Mean time to vehicle inspection (i.e., locked-out vehicles) is short
3. Vulnerable to "Large Scale" Attacks
4. Difficult to identify the source of malicious messages The sharing of a common pool of keys forms the basis of vehicle anonymity in the combinatorial scheme, but it is also the root of the "one affects many" problem. Using a random key distribution, the number of vehicles sharing a certificate in a system with v vehicles, where each holds n certificates from a pool of N, is approximately vn/N. If n=5, N=10,000, and v=200,000,000, the number of vehicles sharing the same certificate is 100,000. Hence, if just one certificate is revoked because of a single misbehaving vehicle, about 100,000 vehicles are impacted. In essence, a large number of innocent vehicles potentially become "collateral damage" from the revocation of a single certificate. The amount of "collateral damage" grows with the number of certificates that are revoked. Geographic zoning is being considered as a potential way to reduce "collateral damage."

If an innocent vehicle becomes the unfortunate victim of a large number of certificate revocations, the vehicle may trigger the enforcement of a re-keying quota. Once a vehicle has reached its re-keying quota, the vehicle is locked-out, i.e., not allowed to re-key, and must be physically inspected before it can rejoin the system as an active participant. Although the intent of the quota is to limit re-keying for misbehaving vehicles, some innocent vehicles will unnecessarily trigger disciplinary actions as "false positives." When the effect is measured as the mean time to vehicle inspection, the combinatorial scheme has been shown to be very sensitive to the number of misbehaving vehicles. For instance, with just a few thousand misbehaving vehicles each year, the mean time to vehicle inspection can be 24 to 36 months, i.e., each vehicle will need to be inspected every two to three years on average. In a system with 200,000,000 vehicles, this results in an undesirable inspection rate of five to eight million vehicles per month.

Any attack that can exploit the "one affects many" weakness in the combinatorial scheme is a serious concern. One particularly damaging attack that efficiently exploits this weakness is the "Large Scale" attack. In a "Large Scale" attack, a large number of certificates are compromised by, for instance, extracting the key information from vehicles. Since the shared pool of certificates is relatively small with respect to the number of vehicles in the system, an attacker need only compromise a relatively small number of vehicles to impact a very large percentage of all vehicles. With N=10,000, a compromise of just 500 vehicles will yield, with 90% probability, more than 20% of the shared pool of certificates. Such an attack would affect about two thirds of the vehicle population, or about 135 million vehicles.

The sharing of certificates, while providing the benefit of anonymity, also makes it difficult to identify misbehaving vehicles. A certificate associated with a malicious message cannot be immediately traced to any particular vehicle. Using the earlier example, the misbehaving vehicle can be any one of 100,000 vehicles.

The detection and removal of a misbehaving vehicle in a vehicle network system is a three step process. First, vehicle messages must be inspected and a determination must be made about whether they are malicious in nature. Second, each malicious message must be traced to a vehicle source. Third, the vehicle source must be disabled from generating messages that will be interpreted as legitimate in the vehicle network system.

Due to the nature of vehicle communication, its non-transactional behavior, and the size of a nationwide vehicle network system, the first step of detecting malicious messages and particularly, those with valid signatures, is an extremely difficult and challenging task. Depending upon the message context, it may be very difficult to delineate malicious message from a valid message. Legitimate messages may on occasion be incorrectly classified as malicious. Some types of malicious behavior may also be beyond the system's ability to detect it. There is also a certain amount of delay in detecting malicious behavior. Some malicious messages may not be observed because it may be impractical to inspect all vehicle messages. The use of thresholds to tally malicious events before taking an action inherently introduces delay. It is also likely that the threshold level will vary depending upon the type of malicious behavior. Some forms may require only one occurrence to trigger action. Others may require multiple occurrences.

In shared certificate schemes, such as the combinatorial scheme, the second step of identifying the vehicle source of a malicious message, which relies upon the consistency and accuracy of the first, is also a difficult and complicated task. Many methods employ techniques that narrow the set of potential vehicles with each re-keying using a multi-round abatement process. But this process could require many rounds to identify the misbehaving vehicle. For instance, if 100,000 vehicles share a single common certificate, it could take up to $\log_2(100,000)$ or 16 rounds of re-keying to identify the individual vehicle source, assuming the vehicle population is narrowed by a factor of two on each round. There are several concerns with multi-step approaches:

Unreliable detection of malicious behavior will delay or potentially undermine the process to identify a misbehaving vehicle.

Each of the multiple rounds of re-keying needed to identify a misbehaving vehicle provides an opportunity for the attacker to change its mode of attack and potentially evade discovery.

Each round of re-keying introduces additional delay and extends the period of time that an attacker can continue operating.

Multiple, simultaneous attacks make identification of misbehaving vehicles more difficult and increase the probability that an innocent vehicle will be identified as a misbehaving vehicle.

The third step of disabling a misbehaving vehicle from generating messages that will be interpreted as legitimate is accomplished by revoking certificates using a certificate revocation list (CRL) and locking out vehicles with either a static or dynamic re-keying quota. Neither effort is instantaneous. CRLs need to be distributed over the air-link to vehicles. The distribution process may require a period of time before every vehicle has received the updated CRL. During this period of time, misbehaving vehicles can still operate. More importantly, once a certificate has been revoked, a misbehaving vehicle can request a replacement certificate and continue to operate. The number of times the misbehaving vehicle can replace its revoked certificates varies depending upon the algorithm used to identify misbehaving vehicles, but it is typically in the range of eight to twenty-five times, depending upon the efficiency of the algorithm.

Finally, another undesirable aspect of the combinatorial scheme is the high probability that all vehicles in a given area will share no common certificates. Despite the sharing of certificates at a system wide level, there is a fairly significant probability that all certificates are unique. When combined with the use of a small number of certificates per vehicle, it is not too difficult to begin linking messages to a particular vehicle source and tracking a vehicle, thereby violating its privacy and anonymity.

The prior art combinatorial scheme has several drawbacks and limitations with preserving privacy, exhibiting strong sensitivity to the number of attackers, and being able to quickly and accurately remove misbehaving vehicles, which are inherent from the sharing of certificates. There is a need for a carefully designed anonymous certificate revocation and replacement process to ensure that the anonymous certificate management system can achieve proper balances among critical objectives, such as scalability, privacy, and performance, and can simplify the identification and removal of misbehaving vehicles.

The following defined terms are used throughout, and VII can be replaced with another vehicle network system.

Anonymous Certificate: A certificate associated with a public-private key pair that, when used by vehicles, will not enable the identification and tracking of vehicles. In a combinatorial certificate scheme, each anonymous certificate will be shared among many vehicles in the VII system. The certificate is attached to a signed message that is generated by a vehicle and is used to verify the digital signature.

Anonymous Key: A private-public key pair that is shared among many vehicles in the VII system and is used to sign messages. Anonymous private keys are highly confidential and any compromise of an anonymous key can threaten the integrity of the VII system.

Attacker: Any entity that may be using anonymous keys and certificates to harm, damage, or manipulate the VII system either maliciously or unintentionally.

Attacker Elimination: The process of removal or rendering an attacker harmless to the VII system. Examples of attacker elimination include proactive system measures, such as locking out a vehicle (i.e., completely revoking all anonymous certificates on a vehicle), and pushing an attacker out of the system by means of certificate expiration.

Certificate: An electronic form of credential that uses a digital signature of a trustworthy authority to attest to the binding of a public key with an identity and/or a set of permissions.

Lock-out: An action taken by the VII system to deny certificate requests, typically because of excessive rekey attempts.

Private Application: An optional value-add service selected by the vehicle owner or occupant that is delivered using the VII system.

Private Key: An encryption/decryption code mathematically related to a paired public key in an asymmetric cryptographic system. A private key is held in secret and is used to decrypt information encrypted by its paired public key or sign information as proof of authenticity or integrity.

Public Application: A mandatory service in the VII system, generally for public safety or improved mobility, that all vehicles participate in using anonymous messages.

Public Key: An encryption code mathematically related to a paired private key in an asymmetric cryptographic system. A public key is shared and used to encrypt information that can only be decrypted by its paired private key. It is computationally infeasible to derive a private key from a public key.

Vehicle Segment: The collection of hardware and software installed in each vehicle that supports VII functions.

BRIEF SUMMARY OF THE INVENTION

The present invention advantageously provides system and method for management of cryptographic keys and certificates for a plurality of vehicles using a short-lived, unlinked certificate scheme. It assigns a large number of unique certificates to each vehicle, which avoids the cumulative impact of shared key schemes. It uses certificate authority partitioning in conjunction with a method to prevent the linking of certificates to provide vehicle privacy. No entity, other than the vehicle itself has knowledge of its complete set of certificates or its private keys. Misused certificates are not ordinarily revoked, hence reducing or eliminating the need to distribute and process certificate revocation lists (CRLs). Instead, certificates are short-lived and attackers are eliminated from the VII system during the certificate replacement process or by certificate expiration.

The inventive method for management of cryptographic keys and certificates for a plurality of vehicles comprises steps of: for a vehicle of said plurality of vehicles: generating public/private key pairs; requesting a plurality of time-distributed certificates; creating and presenting an encrypted identity; and surrendering expired certificates; for an assigning authority: receiving said public/private key pairs, said request for time-distributed certificates, said encrypted identity, and said expired certificates from said vehicle; authorizing said vehicle with an authorizing authority; validating said expired certificates; proving ownership; and distributing said requested time-distributed certificates to said vehicle.

Validation of expired certificates can comprise checking expired certificates against misused, compromised and/or previously surrendered certificates. Time-distributed certificates can have lifetimes adjustable based on certificate misuse detection system algorithms, amount of malicious activity detected, and/or certificate authority capacity.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
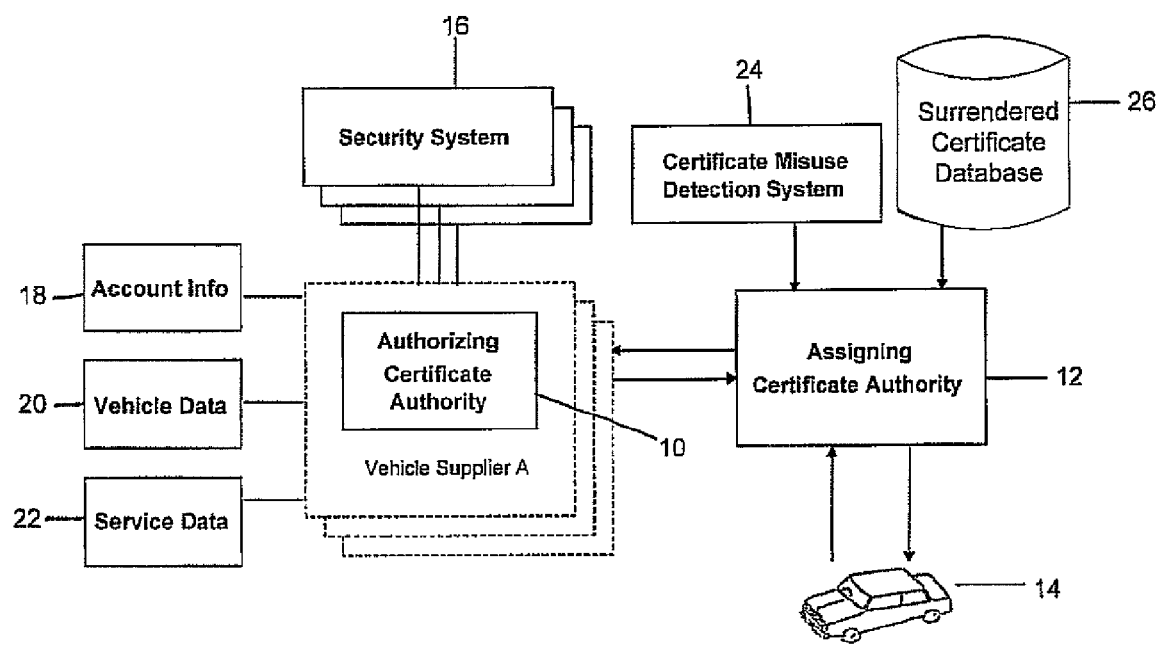
FIG. 1 shows Certificate Authority Partitioning in the Short-lived, Unlinked Certificate Management Scheme.

An anonymous certificate management scheme that avoids the "one affects many" problem and provides a straightforward method to eliminate attackers is presented. The basic principles of the proposed short-lived, unlinked certificate scheme are:

Each vehicle is assigned a large number of unique, unlinked certificates (n~100 to 1000) by an Assigning Certificate Authority.

Certificate authority partitioning is used to separate certificate authorization and assignment functions. The Authorizing Certificate Authority has no knowledge of the vehicle certificates. The Assigning Certificate Authority has no knowledge of the vehicle identity.

Certificates are assigned in such way that the Assigning Certificate Authority does know the complete set of certificates held by any vehicle.

Certificates are not ordinarily revoked. Instead, certificates are short-lived and attackers are removed from the system during the certificate replacement process or as a result of certificate expiration.

The short-lived, unlinked certificate scheme overcomes the "one affects many" problem by assigning unique certificates to each vehicle. Because certificates are not shared, any misuse that leads to the invalidation of a certificate affects only the compromised vehicle. The threat of an attacker learning all of the unique certificates for a particular vehicle is diminished by the use of a large number of unlinked certificates. A vehicle would need to be tracked for a long period under conditions where a message can be eavesdropped on the air link and unequivocally linked to a vehicle as its source for an attacker to learn all of a vehicle's certificates. In this respect, vehicle privacy is improved over the combinatorial certificate scheme where each vehicle possesses a small number of shared certificates that are essentially unique unless there are hundreds, if not thousands, of vehicles in a given area. The probability that the same certificate is selected again by the vehicle to sign a message in the short-lived, unlinked certificate scheme is much lower than the combinatorial scheme.

The use of unique certificates in the short-lived, unlinked certificate scheme does, however, require special techniques not described by prior schemes to protect the anonymity of vehicles. In particular, no entity other than the vehicle holding certificates should know of its complete certificate set nor should any single entity be able to associate a set of certificates with a particular vehicle, even if the vehicle's identity is not known. The vehicle network infrastructure itself is in the best position to track a vehicle, especially if it is capable of associating a large number of unique certificates with a particular vehicle. This is one disadvantage inherent in the prior art linked certificate schemes, i.e., the holder of the seed used to generate a group of unique, linked certificates has too much information about a vehicle.

The short-lived, unlinked certificate management scheme uses both Certificate Authority Partitioning and Unlinked Certificate Assignment to provide vehicle anonymity.

FIG. 1 illustrates the concept of certificate authority partitioning in the short-lived, unlinked certificate scheme. The principle components are the Authorizing Certificate Authority 10, the Assigning Certificate Authority 12, and the vehicle 14.

Authorizing Certificate Authority Functions

The Authorizing Certificate Authority 10 has three primary functions. One function is to issue the long term vehicle identifying certificate, which is unique to each vehicle. The identifying certificate is assigned during vehicle manufacture, preferably through a process where the vehicle generates the long term identifying key pair. The Authorizing Certificate Authority 10 also makes its public key known to the vehicle 14 when it assigns the long term identifying certificate.

A second function of the Authorizing Certificate Authority 10 is to authorize vehicle requests for certificates via a proxy through the Assigning Certificate Authority 12. A security system performs authorization checks on every request for certificates. The authorization checks preferably include:

Is the vehicle registered with the Authorizing Certificate Authority?

This authorization check is intended to deny attackers who intentionally direct their requests to the wrong Authorizing Certificate Authority 10 in an attempt to acquire certificates.

Has the vehicle been reported stolen?

When a vehicle 14 is reported stolen, VI policies may dictate whether or not the vehicle 14 is allowed to rekey.

Has the vehicle been recycled or salvaged?

Although not essential, it would be beneficial for the Authorizing Certificate Authority 10 to know whether a vehicle 14 is no longer in service. If a vehicle 14 has been recycled or salvaged, all attempts to rekey using its long term identifying certificate should be denied. This would help prevent attackers from maliciously using onboard equipment (OBE) acquired from salvage yards.

Is the vehicle of a model whose VII functions are known to have been compromised?

Each vehicle manufacturer will develop and deploy its own version of an OBE. Some vehicle manufacturers will deploy different versions of OBE based on the class of vehicle. In addition, OBE implementations will periodically be re-designed to incorporate new features, new hardware, and cost reductions. Each OBE implementation has the potential to inadvertently introduce a serious vulnerability in the vehicle network system. Some vulnerabilities may be patched by a software update. Others may require replacement of the OBE. Once an attacker identifies a particular model of OBE with an exploitable weakness, the VII requires a mechanism to deny rekeying to affected vehicles until such time as they have been repaired.

Does the vehicle contain an OBE that needs to be replaced or is no longer supported in the VII system?

The VII system is intended to be a long term component of the national highway infrastructure. Improvements and other changes to the VII system may occur after its deployment. At some point, a system modification may be introduced that, for instance, provides positive safety benefits, but is not compatible with certain vintages of OBE. This authorization check provides a means for the VII system to exclude certain vehicles as active participants until such time as they are upgraded.

Has the vehicle been locked-out?

In the short-lived, unlinked certificate scheme, vehicles that have been denied a rekeying request, for instance, because they are associated with certificates that have been misused, can be locked-out of the system and denied all future rekeying requests until they have passed a more stringent test, such as a vehicle inspection.

Has the vehicle been rekeying excessively?

This authorization check is designed to detect and deny rekeying requests if a vehicle rekeys more often than expected. It can be used to detect attacks where, for instance, expired certificates from salvage vehicles are obtained and used by an attacker to increase the size of their certificate pool. By increasing the number of certificates at their disposal, attackers may spread their attack across a large number of certificates and potentially make their activity fall below the detection threshold of the VII system. It is recommended that the Authorizing Certificate Authority 10 maintain a count of all rekeying requests and a sliding window of the number of rekeying requests that were authorized for each vehicle 14. If a vehicle 14 rekeys more than an expected amount, the vehicle 14 can be considered suspect and denied. The window duration and rekeying threshold should take into consideration the certificate lifetime, number of certificates per vehicle, and number of requests needed to replace a vehicle's complete set of certificates once.

Is the vehicle still in the initialization stage?

This authorization check is designed to detect if a vehicle 14 has completed initialization and has received its first set of n certificates. The Authorizing Certificate Authority 10 temporarily keeps track of the number of certificates provided to each vehicle 14. When the vehicle 14 has received n certificates, a flag is set to indicate that the vehicle is initialized. The Authorizing Certificate Authority 10 informs the Assigning Certificate Authority 12 about whether the vehicle has past the initialization stage and should be able to surrender expired certificates.

Is the vehicle requesting fewer keys over time?

This authorization check is designed to detect a "Sequential Certificate Use" attack that is described in detail below. The Authorizing Certificate Authority 10 observes the number of certificates requested by a vehicle 14 over time and detects vehicles that are consistently requesting fewer total certificates within a certificate interval. This security check can be done off-line and does not need to be performed during a certificate request process.

A third function of the Authorizing Certificate Authority 10 is to optionally store other identifying information about each vehicle 14, such as its vehicle identification number, build options, configuration, software versions, owner info, and potentially subscriber account information for original equipment manufacturer (OEM) services. As shown in FIG. 1, the Authorizing Certificate Authority 10 is supported by several subsystems, such as account information 18, vehicle data 20, and service data sources 22. Because the Authorizing Certificate Authority 10 contains vehicle identifying information, it is assumed to be privately held by vehicle manufacturers.

Assigning Certificate Authority Functions

The Assigning Certificate Authority 12 in the short-lived, unlinked certificate scheme is tasked with processing vehicle requests for certificate replacement and publishing emergency CRLs to vehicles. It is supported by a Certificate Misuse Detection System 24, which provides the Assigning Certificate Authority 12 with a list of certificates that have been misused, and a Surrendered Certificate Database 26, which keeps track of surrendered certificates. The Assigning Certificate Authority 12 performs a series of validation checks on each certificate request. These validation checks are described below as part of the transaction flow. If the validation checks are successful and the request is authorized by the Authorizing Certificate Authority 10, the vehicle 14 is assigned one or more certificates with a short-lived expiration, which is on the order of several weeks.

It is essential to prevent the Assigning Certificate Authority 12 from building certificate associations, even if it does not know to which vehicle a set of unique certificates belongs. The reason is to prevent an adversary from eavesdropping on a target vehicle, identifying at least one of its certificates, and then making use of the vehicle network infrastructure to retrieve the entire set of certificates that belongs to the target vehicle. If the vehicle network infrastructure knows the set of unique certificates for a vehicle, it can potentially implement roadside equipment (RSE) probes and promiscuously collect, filter, and monitor transmissions for a particular vehicle.

The short-lived, unlinked certificate scheme prevents that Assigning Certificate Authority 12 from building a complete set of certificates for a vehicle 14 by using an unlinked certificate assignment method where certificates are not all assigned to a vehicle 14 in a single request. Instead, the certificates are assigned over the course of multiple transactions that are distributed over a period of time to take advantage of the mixing of requests from a large number of vehicles. The requests are not periodic, but instead they are made at random intervals within a pre-defined window to prevent the Assigning Certificate Authority 12 from inferring certificate associations through a temporal analysis of the requests.

The Assigning Certificate Authority 12 may on rare occasions publish an emergency CRL to revoke certificates that are causing significant disruption to the system. The "Message Flooding" attack described below might be one of a limited number of attacks that merit revoking certificates to more quickly eliminate attackers. Other less disruptive attacks would not trigger certificate revocation, but rather would rely upon certificate expiration to purge attackers. Since certificate life times are short, the emergency CRL quickly decreases in length. Large CRLs are a problem in prior art certificate management schemes.

Optionally, the Assigning Certificate Authority 12 can treat vehicle-to-vehicle and vehicle-to-infrastructure communication separately and publish CRLs on a regular basis for RSEs, which have a more reliable and higher bandwidth network connection and are less 4 resource constrained.

Certificate Request Transaction Flow

The certificate request transaction is central to the short-lived, unlinked certificate scheme. It is the mechanism whereby vehicles can safely request certificates in a way that:

Maintains the separation of vehicle identity and certificate assignment;

Prevents the association of certificates, even for an unidentified vehicle; and

Eliminates attackers from the vehicle network system.

A critical aspect of preventing the linking of requests, i.e. unlinkability, is to eliminate the use of static identifiers between requests. In all previous methods, this aspect has not been considered because all certificates were assumed to be assigned in bulk or the certificates were reused by many vehicles. In the short-lived, unlinked certificate method, the Authorizing Certificate Authority 10 needs to know the long term identity of the vehicle 14. To satisfy this need and not reveal the vehicle identity or a static identifier associated with the vehicle 14 to the Assigning Certificate Authority 12, the vehicle 14 passes its encrypted long term identifier and the number of certificates requested (w) in the certificate request. The long term identifier contains a timestamp, nonce, or other temporal value so that the encrypted result is not static and cannot be used by the Assigning Certificate Authority 12 to link certificate requests. The long term identifier can be the vehicle's long term identifying certificate signed with its long term identifying private key and encrypted using the public key of the Authorizing Certificate Authority 10.

Unlinkability is related to anonymity, in that they both are different aspects of privacy. Informally, our unlinkability notions intend to model different ways of guaranteeing the following intuitive property: it is hard to choose two produced and valid signatures that can be declared as being produced by a single (vehicle) client, except with small probability. Similar to anonymity, an accurate formalization of unlinkability notions takes into account the adversary's auxiliary information about the candidate signers and/or the information available to members of the infrastructure. More precisely, we define an unlinkability attack probability experiment, where, after the setup phase and the joining phase (with $u \geq 2$ clients), the adversary uses its auxiliary information and records an arbitrary large number of valid signatures produced by a randomly and independently chosen clients. At the end, the adversary chooses two among these signatures. The adversary's advantage is defined as the difference, in absolute value, between the probability that the two chosen signatures were produced by the same client and the probability that two randomly chosen signatures among those recorded by the adversaries (which is $1/u$). We then say that a public key infrastructure satisfies unlinkability if the adversary's advantage in this experiment is negligible in the security parameter $\lambda$.

As with anonymity, the adversary, in addition to recording signatures, will try to increase its auxiliary information by intruding into either the vehicle manufacturers' databases or the Authorizing or Assigning Certificate Authority's database or both, where the intrusion can happen at any time while the adversary is recording the valid signatures. According to the resulting auxiliary information used by the adversary in our probability experiments, as with anonymity, we can enhance the above definition of unlinkability into three types: unlinkability against full intruders, unlinkability against partial intruders, and unlinkability against observers, each being stronger than the next. We can further define weaker versions of the first two of these variants, by defining the following notions.

Backward Unlinkability against (partial/full) intruders: the adversary's can only choose its two signatures among the signatures recorded before performing its intrusion.

Forward Unlinkability against (partial/full) intruders: the adversary's can only choose its two signatures among the signatures recorded after performing its intrusion.

We note that the notion of backward unlinkability keeps recorded signatures unlinkable until an intrusion happens, but does not guarantee unlinkability for signatures obtained after the intrusion. Instead, forward unlinkability keeps signatures recorded after an intrusion unlinkable, but does not guarantee unlinkability for signatures obtained before the intrusion.

Figure 2:
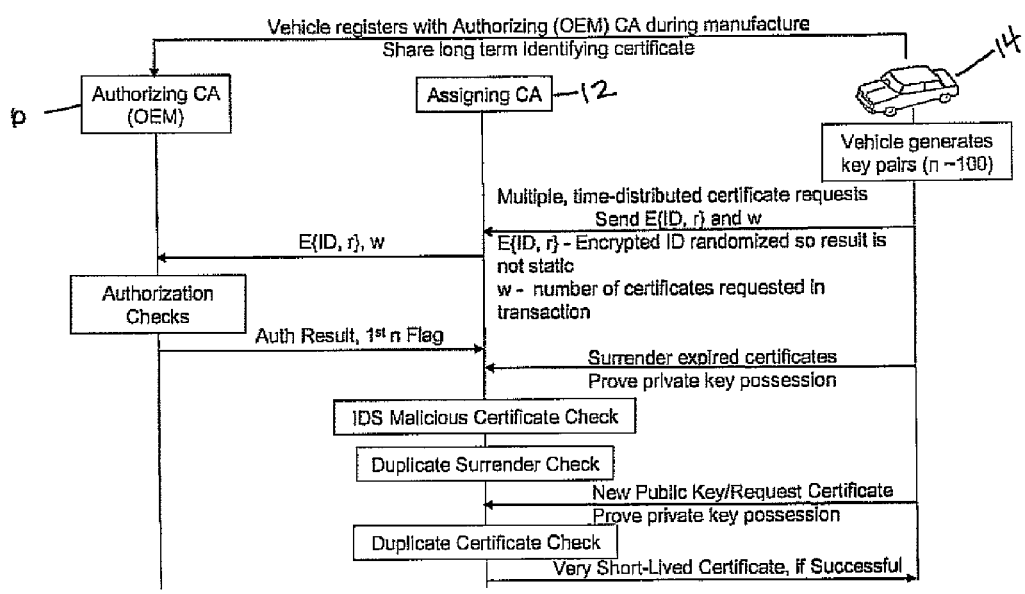
FIG. 2 illustrates Short-lived, Unlinked Certificate Request Transaction Flow.

FIG. 2 provides an overview of the transaction flow for the certificate replacement process, in accordance with the system shown in FIG. 1. This process assumes that each vehicle 14 has previously registered with an Authorizing Certificate Authority 10, which has issued a long term identifying certificate to the vehicle 14. Registration preferably takes place during vehicle manufacture. Although the vehicle can be loaded with short-lived, unlinked certificates during registration, advantageously one assumes that the vehicle 14 acquires its first set of certificates using the same process that is used for certificate replacement.

Figure 3:
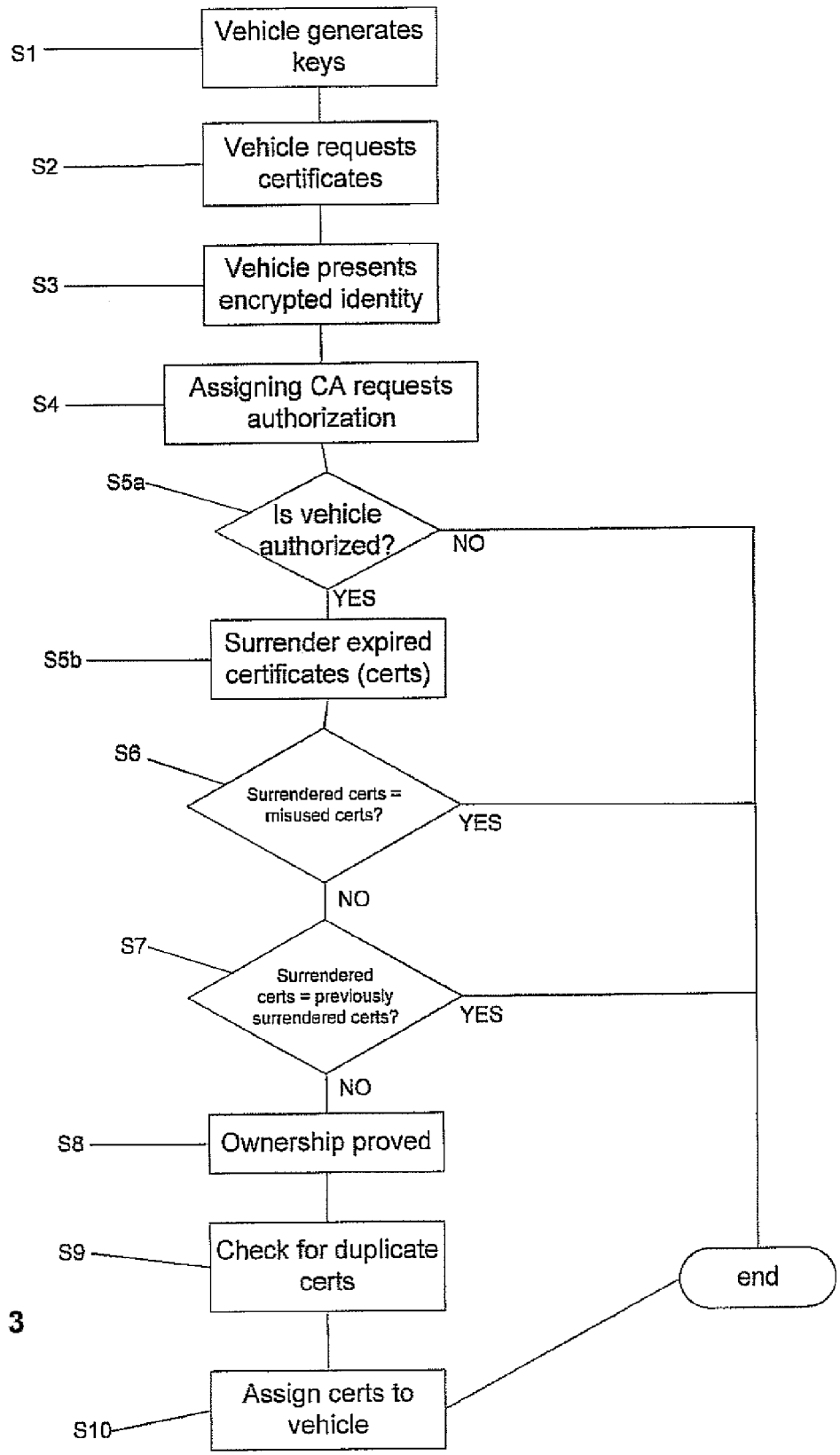
FIG. 3 is a flowchart of an exemplary embodiment.

FIG. 3 shows a flowchart of the steps in the transaction flow, in accordance with the system shown in FIG. 1. In step S1, a vehicle 14 generates public/private key pairs. In step S2, multiple, time-distributed certificates are requested by the vehicle 14, and a randomized, encrypted identity for the vehicle 14 is presented in step S3. Authorization is requested, in step S4, from the Authorizing Certificate Authority 10 by the Assigning Certificate Authority 12. If the vehicle is authorized (S5$a$=YES), expired certificates are surrendered in step S5$b$. In step S6, the Assigning Certificate Authority 12 compares the expired certificates with a list of misused or compromised certificates. If an expired certificate is not found on the list (S6=NO), the expired certificates are checked against a list of previously surrendered certificates. If a match is not found (S7=NO), ownership is proved in step S8. In step S9, an optional step checking for duplicate certificates is performed. New short-lived, unlinked certificates are assigned to the vehicle 14 by the Assigning Certificate Authority 12 in step 10.

If the vehicle is not authorized (S5$a$=NO), the process terminates without the issuance of new certificates. Also, if an expired certificate is either found on the list of misused or compromised certificates (S6=YES), or found to be previously surrendered (S7=YES), the process terminates without new certificates being issued.

A detailed description of the certificate request transaction flow is now presented.

Step S1: vehicle generates public/private key pairs. Before a vehicle initiates the certificate replacement transaction, it generates a set of unique public/private key pairs for which it will seek certificates from the Assigning Certificate Authority. Because the vehicle generates the public/private key pairs as opposed to being assigned key pairs by a certificate authority, knowledge of the private keys is advantageously held by one only entity in the VII system, i.e., the vehicle that generates and uses them.

Step S2: Multiple, time-distributed certificate requests. Upon creating the public/private key pairs, the vehicle launches a series of requests to obtain certificates from the Assigning Certificate Authority. Unlike previous methods, the vehicle does not acquire all of its certificates in a single request. Instead, multiple requests that are distributed over time take advantage of the natural anonymity provided by the statistical mixing of requests from many vehicles. In each request, the vehicle attempts to obtain w certificates, where w is randomly selected by the vehicle. The maximum value of w (W) can be a system parameter to help adjust the volume of certificate replacement requests. The Assigning Certificate Authority, for instance, can set parameter W, but the vehicle can select to request any number of certificates from 1 through W. In this manner, the VII system has limited ability to force associations among certificates through knowledge of what certificates were provided in a single request.

The certificate requests are distributed over a spreading period of time, $t_{spreading}$, and the intervals between requests are randomized such that the Assigning Certificate Authority cannot successfully perform a temporal analysis on the requests and link requests from a vehicle. The time period $t_{spreading}$ may be on the order of the certificate lifetimes. However, more analysis is needed to judiciously choose the range given the desire to quickly remove attackers, manage rekeying volume, and maintain the unlinkability among certificate requests.

Step S3: Randomized, Encrypted Identity. To acquire certificates, the vehicle must present its long term identity. However, presenting its identity in the clear would provide the Assigning Certificate Authority 12 with a static identifier that can be used to link the multiple, time-distributed requests. Simply encrypting the vehicle identity is also not sufficient because the encrypted result would be static and it could be used as a vehicle identifier to link certificate requests. Instead, the short-lived, unlinked certificate scheme requires the vehicle to encrypt its identity with a temporal value, such as a timestamp or random nonce, such that the encrypted result varies. The vehicle 14 uses the public key of the Authorizing Certificate Authority 10 to asymmetrically encrypt the combination of its identity and temporal value. In one implementation, the binary value of the vehicle's identity can be interleaved with a random nonce to sufficiently randomize the encrypted result.

Step S4: Request Authorization. Upon receiving a certificate request, the Assigning Certificate Authority 12 queries the Authorizing Certificate Authority 10 for approval. It passes the randomized, encrypted vehicle identity and the number of certificates, w, which is being requested in the transaction. The Authorizing Certificate Authority 10 decrypts the randomized, encrypted vehicle identity using its private key and performs a series of authorization checks as previously described. The Authorizing Certificate Authority 10 returns an authorization result to the Assigning Certificate Authority 12 along with an indication of whether the vehicle has past the initialization stage.

Step S5 (S5$a$ and S5$b$): Surrender Expired Certificates. Assuming the authorization result is positive, the Assigning Certificate Authority 12 signals the vehicle 14 to surrender its expired certificates. The short-lived, unlinked certificate scheme requires each vehicle 14 to present its expired certificates and prove ownership of those certificates. For each certificate that is requested, the vehicle 14 must present an expired certificate. It must prove ownership of the private key by, for instance, signing the certificate with the corresponding private key. The only exception is the case where a vehicle 14 is still initializing and has not yet received its first n certificates. In this case, the Assigning Certificate Authority 12 has been informed by the Authorizing Certificate Authority 10 that the vehicle is still initializing and the Assigning Certificate Authority 12 can grant it an exemption from surrendering the expected number of expired certificates.

Step S6: Malicious Certificate Check. The Assigning Certificate Authority 12 receives a list of certificates that its Certificate Misuse Detection System 24 has identified as being compromised or associated with malicious behavior. The Assigning Certificate Authority 12 compares each of the expired certificates received from the vehicle against this list, If any of the surrendered certificates are on the misused certificate list, rekeying is denied and, preferably, the Authorizing Certificate Authority 10 is informed and makes record that the vehicle 14 has been locked-out and needs to be inspected. An extension to the Malicious Certificate Check is described below as a countermeasure to the "Sequential Certificate Use" attack, which is also described below.

Step S7: Multiple Surrenders of the Same Certificate. Because the Assigning Certificate Authority 12 does not know the identity of the vehicle 14 making a certificate request or the set of certificates that a vehicle possesses, the Assigning Certificate Authority 12 must protect against an attack where a vehicle 14 attempts to surrender the same expired certificate in multiple requests. Although other solutions may be possible, the preferred solution is to maintain a database of surrendered certificates, such as Surrendered Certificate Database 26. Every time a certificate is surrendered, the database is queried to determine if it has previously been surrendered. If not, the certificate is added to the database and the rekeying process continues. Otherwise, the rekeying process is halted and the vehicle 14 may be locked-out. The database can be a flat file that is distributed and back-end processing can sort and organize the database to improve search efficiency. It is possible to safely delete surrendered certificates that are older than a given time period to limit database size.

Step S8: Prove Ownership. The Assigning Certificate Authority 12 confirms that the vehicle 14 making the certificate request has the private key for the certificate being requested by checking the signature.

Step S9: Duplicate Certificate Check. The check for duplicate certificates is optional and depends largely upon the probability that two or more vehicles will generate the same public/private key pair and request a certificate in the same time interval. Certificates need to remain unique so that a misused certificate can be traced to a single vehicle. The Assigning Certificate Authority 12 can perform this check by maintaining a list of all certificates that it issued over its current certificate interval. For instance, if the Assigning Certificate Authority 12 uses a granularity of one day in its certificate expiration date, the Assigning Certificate Authority 12 would only need to maintain a list of certificates that it issued in the current day. To perform the duplicate certificate check, the Assigning Certificate Authority 12 would generate a new certificate and compare it against the list of certificates issued in the current certificate interval. If a duplicate is found, the vehicle 14 is requested to generate an alternate public/private key pair. To prevent disclosing that a key pair generated by a vehicle has a duplicate in use, the Assigning Certificate Authority 14 can randomly request vehicles to generate alternate public/private key pairs. If the duplicate check is not performed and certificate duplication occurs, the result is that one vehicle would lose a certificate, which is not serious given that n is approximately 100. If the duplicate certificate is additionally used maliciously by a vehicle, both vehicles could be locked-out.

Step S10: Assign Short-lived, unlinked certificates. If the vehicle has satisfied all the above Authorizing 10 and Assigning Certificate Authority 12 checks, the Assigning Certificate Authority 12 generates and sends the vehicle 14 one or more short-live certificates. The lifetime of the certificates is on the order of weeks and can be adjusted based on the characteristics of the certificate misuse detection system algorithms, the amount of malicious activity detected, and certificate authority capacity available in the VII system.

Exemplary Implementation Technique

A method for implementing a short-lived, unlinked certificate scheme is presented. Specifically, each vehicle manufacturer creates a seed-generated sequence of pseudonyms for each of its vehicles, and gives the seed and a counter to the vehicle 14, and the first pseudonym in the sequence to the Authorizing Certificate Authority 10, consisting of a nonce and a secret key for a pseudo-random function. At any given time, the vehicle 14 will keep the seed and counter that generate its pseudonym, as stored with the Authorizing Certificate Authority 10. The vehicle 14 uses the seed and counter to generate public/private key pairs. When the vehicle 14 requests new certificates, the Authorizing Certificate Authority 10 can verify that the request from this vehicle 14 is from an authorized vehicle without interacting with any vehicle manufacturer, and the Authorizing Certificate Authority 10 still cannot tell the vehicle's identity. Furthermore, at any key update, the vehicle 14 increments the counter and provides the new pseudonym to the Authorizing Certificate Authority 10 that deletes the previous one. Thus, an intruder will not be able to violate unlinkability for all signatures recorded previously to the intrusion. The price to pay for this gained efficiency is that the resulting scheme only satisfies backward unlinkability against partial intruders and does not satisfy forward unlinkability (and thus, unlinkability) against partial intruders.

Algorithms SIGN, VER, DET, and KTR are defined as follows. SIGN is a message signing algorithm run by each vehicle to protect communication integrity and authenticate messages, that on input of a public file pF, a secret file sF, and a message m, returns a signature sig. VER is a signature verification algorithm, run by each vehicle to verify the integrity and authenticity of the received communication, that, on input a message m and signature sig, returns 1, meaning that sig is a valid signature, or 0 otherwise. These algorithms that are semantically equivalent (but syntactically different) to analogous algorithms in digital signature schemes.

DET is a malicious key detection algorithm used by the Authorizing Certificate Authority 10 to detect whether a given message signed using a signature public key is malicious or not; specifically, on input of a message m and a signature sig, algorithm DET returns 1, meaning that this is a malicious message, or 0 otherwise.

KTR is a key tracing algorithm, which attempts to detect if a given vehicle might have used a given malicious communication transcript along with its public key. On input the Authorizing Certificate Authority's database, a vehicle manufacturer's database, an index j, a communication transcript tr, algorithm KTR returns a string in {yes, no} denoting whether vehicle Vj, for some j ∈ {1, ..., u} might have generated this transcript or not. Note that if KTR returns no, then we are sure that vehicle Vj did not generate such transcript; instead, if KTR returns yes, then we can at most infer that such transcript was generated by one of the vehicle Vj for which KTR would return YES.

The management subprotocols are defined as follows.

The subprotocol $KM_{leave}$ consists of the Authorizing Certificate Authority 10 appending $vk_{ij}$, for j=1, ..., n, on the certificate revocation list when vehicle $V_i$ is leaving.

The subprotocol $KM_{start}$ consists of each vehicle manufacturer running KeyGen and obtaining n pairs $(vk_{ij}, sk_{ij})$ of signature keys, for i=1, 2, ..., and j=1, ..., n, and obtaining certificates for them from the Authorizing Certificate Authority 10.

The subprotocol $KM_{join}$, consists of the vehicle manufacturer sending the (certified) pairs $(vk_{i1}, sk_{i1}), ..., (vk_{in}, sk_{in})$ to a joining vehicle $V_i$, and generating a random seed $s_i$ for a pseudo-random function, a counter $c_i=1$, and pair $(r_i, k_i)=f_{si}(c_i)$, where $r_i$ is a long random nonce, $k_i$ is a random symmetric key for data authentication, and f is a pseudo-random function. Finally, the vehicle manufacturer sends $(r_i, k_i)$ to the Authorizing Certificate Authority 10 and $(s_i, c_i)$ to $V_i$.

The subprotocol $KM_{update}$ consists of the following:

Vehicle $V_i$ computes $(r_i, k_i)=f_{si}(c_i)$ and $(r'_i, k'_i)=f_{si}(c_i+1)$ and includes in its key update request an encryption of its nonce $r_i$ and pair $(r'_i, k'_i)$. This request is sent to the Assigning Certificate Authority 12 that communicates with the Authorizing Certificate Authority 12 to authenticate the vehicle 14.

Vehicle Vi authenticates its time-stamped request to update a key by attaching the output of a pseudorandom function that uses $k_i$ as its key.

The Authorizing Certificate Authority 10 decrypts nonce $r_i$, finds the associated symmetric key $k_i$ in its database and checks that the update request was authenticated using $k_i$. If successful, the Authorizing Certificate Authority 10 replies to the key update request by generating a new certified key pair and sending it (in encrypted form) to V' through the Assigning Certificate Authority 12, and replaces $(r_i, k_i)$ with $(r'_i, k'_i)$ on its database.

After receiving the new certified key pair, $V_i$ increments counter $c_i$ by 1.

To illustrate that this scheme satisfies unlinkability against observers, we note the only potentially linking data sent by a vehicle $V_i$ are its nonce $r_i$ and its authentication tag computed using a pseudo-random function and $k_i$ as a symmetric key. However, the nonce $r_i$ is sent encrypted and the output of the pseudo-random function is computed using distinct inputs, as they are time-stamped, and thus are indistinguishable from random and independent tags.

In fact, this scheme satisfies backward unlinkability against partial intruders. This follows from the fact that at any key update, the vehicle increments the counter and provides the new pair $(r'_i, k'_i)$ to the Authorizing Certificate Authority 10 that deletes the previous pair $(r_i, k_i)$. Thus, an intruder will not be able to link the current pair $(r'_i, k'_i)$ to the deleted pair $(r_i, k_i)$ and, similarly, to the previous deleted pairs, and thus will not be able to violate unlinkability with respect to all signatures recorded previously to the intrusion. On the other hand, we cannot use such an argument towards proving forward unlinkability, as an intruder will keep both the current pair $(r_i, k_i)$ and the future pair $(r'_i, k'_i)$, and thus will be able to link their usage to the same vehicle.

The scheme satisfies anonymity against partial intruders, as all pairs $(r_i, k_i)$ in the Authorizing Certificate Authority's database are equally distributed and thus they reveal no information about which vehicle each pair is associated with. Furthermore, this scheme is non-interactive, in that it does not require the involvement of vehicle manufacturers during its execution, after vehicle initialization.

Attacker Elimination

The short-lived, unlinked certificate scheme relies upon the principle of "frequently proving innocence" to eliminate attackers. The concept of "frequently proving innocence" is implemented by using short-lived, unlinked certificates, which preferably have lifetimes on the order of several weeks. Attackers are purged during the certificate replacement process. Specifically, each vehicle must surrender its expired certificates to acquire a replacement. Replacement of expired certificates is done on a one-for-one basis. By surrendering its expired certificate, the vehicle enables the Assigning Certificate Authority 12 to determine its innocence or guilt. If the vehicle 14 surrenders a certificate that was associated with malicious activity, the vehicle is denied new certificates and locked-out. Similarly, if any vehicle attempts to surrender a certificate that was previously surrendered, it is denied and locked out as this action in itself is malicious.

The use of short-lived, unlinked certificates provides a couple of additional benefits beyond frequently proving innocence. First, short-lived, unlinked certificates can remove the need to publish periodic CRLs because removal of invalid certificates occurs through the process of expiration. Since the expiration period is short, invalid certificates will expire rather quickly and, in prior art systems, before a CRL update propagates throughout the entire system. When expiration dates are used with certificates, the purpose of the CRL is essentially to address serious threats that cannot wait for the certificates to expire. If the expiration period is short, the delay in distributing a CRL may be on the same order as the expiration period. If the system can tolerate a short period of malicious behavior, the process can be simplified by eliminating the CRL altogether. Second, the ability to forgo publishing a CRL eliminates a major problem with unique certificate schemes, i.e., CRLs for unique certificates very quickly grow to be very large. In the short-lived, unlinked certificate scheme, CRL are not ordinarily published to vehicles.

The certificate lifetime in the short-lived, unlinked certificate scheme can be an adjustable system parameter. To some extent, this helps to address the issue of an unknown number of attackers or rate of attack. The lifetime of a certificate can be adjusted, for instance, based on the amount of malicious activity detected in the VII system. If the amount of malicious activity is low, certificate lifetimes can be increased to lower overall certificate authority load. If the amount of malicious activity increases, the certificate lifetimes can be shorted to more quickly purge attackers. In this manner, the system can be "throttled." One constraint is that the certificate lifetime should not be made shorter than the time it takes the system to detect malicious behavior. Otherwise, certificates get replaced before malicious behavior can be detected.

Another potential benefit is that certificate lifetimes and other system parameters can be tailored on a regional basis without much coordination among the different regions. For instance, certificate lifetimes can be based on RSE coverage and population densities. Metropolitan areas with good RSE coverage can use shorter certificate lifetimes because vehicles frequent areas with RSE coverage and can conveniently complete certificate replacement transactions. In rural areas where RSE coverage is sparse, longer certificate lifetimes can be used to help reduce the possibility that all certificates expire before a vehicle re-enters RSE coverage. The primary coordination that is required among regions is the sharing of the misused certificate list and the Surrendered Certificate Database 26.

Time Required to Eliminate an Attacker

The detection and elimination of an attacker in the VII system is a three step process. First, vehicle communication messages must be inspected and a determination must be made about whether they are malicious in nature. Second, each malicious message must be traced to a vehicle source. Third, the vehicle source must be rendered unable to generate messages that will be interpreted as legitimate in the VII system.

The first step of detecting malicious 1609.2 messages is generally recognized as a very difficult task. All certificate management schemes proposed to date presume that an effective malicious message detection capability can be built. Hence, this is an area that continues to be investigated. Accordingly, it is sufficient to acknowledge that the detection of malicious messages may not be completely reliable and that there will be some delay in detecting malicious activity.

Reliable and consistent detection of malicious messages is a factor. Depending upon the message context, it may be very difficult to delineate a malicious message from a valid message. Legitimate messages may on occasion be incorrectly classified as malicious. Some types of malicious behavior may also be beyond the system's ability to detect it. There is also a certain amount of delay in detecting malicious behavior. Some malicious messages may not be observed because it may be impractical to inspect all messages. The use of thresholds to tally malicious events before taking an action inherently introduces delay. It is also likely that the threshold level will vary depending upon the type of malicious behavior. Some forms of attack may require only one occurrence to trigger an action. Others may require multiple occurrences.

The short-lived, unlinked certificate scheme has an advantage over shared certificate schemes in tracing the vehicle source of malicious behavior. Unlike the shared certificate schemes, with the short-lived approach there is no ambiguity in the source of the malicious behavior because each certificate is unique to a particular vehicle. Hence, there is no need to narrow a suspect population of vehicles. Even if attackers share certificates, any attacker who surrenders a certificate associated with malicious behavior will be locked-out. If an attacker happens to steal certificates and/or keys from an unsuspecting vehicle and uses them maliciously, the compromised vehicle will also be locked-out. Although an innocent vehicle will be locked-out, the scheme is actually working as desired because the innocent vehicle has been compromised.

Locking-out a vehicle does not prevent it from using valid certificates that it already possesses. In the short-lived, unlinked certificate scheme, vehicle certificates do not all expire at the same time because they were initially assigned at different times. The total time from when malicious behavior is first detected to the instant that the attacker is rendered unable to generate messages that will be interpreted as legitimate, assuming that an attacker uses all certificates in its cache is approximately:

$$c_{lifetime} + t_{spreading} \qquad \text{Eqn 1}$$

where:

$c_{lifetime}$ is the lifetime of a certificate $t_{spreading}$ is the period over which certificates are acquired (i.e., "spreading period")

If the certificate lifetime is two weeks and the spreading period is one week, the total time to eliminate an attacker is three weeks. This appears to be advantageous over the shared certificate schemes. However, the short-lived, unlinked certificate scheme is susceptible to the "Sequential Certificate Use" attack.

Sequential Certificate Use Attack

This attack attempts to maximize the time that an attacker can continue to operate with valid certificates. Previously, it was assumed that an attacker would use all of its certificates to spread out its malicious activity in an attempt to evade detection. This attack takes a different approach and employs the sequential use of certificates. An attacker uses a single certificate to generate all malicious messages and stores the remaining n−1 certificates. When the certificates expire, the attacker makes a certificate replacement request and surrenders one or more of the stored certificates that were not used in malicious activity. The certificate used to generate malicious behavior is never surrendered. Otherwise, the attacker would be recognized and prevented from rekeying. Upon receiving a fresh set of certificates, the attacker selects one certificate from its remaining set of n−1 to sign malicious messages and stores the remaining n−2 certificates. The cycle continues until the attacker exhausts all certificates. The total time to exhaust a set of n certificates in this attack is about:

$$n*(c_{lifetime} + t_{spreading}) \qquad \text{Eqn 2}$$

where:

n is the number of certificates per vehicle $C_{lifetime}$ is the lifetime of a certificate If each vehicle has one hundred (100) certificates and the certificate lifetime is two weeks and the spreading time is one week, the total time that an attacker can operate is about 3*100=300 weeks. This assumes that the attacker generates at least one malicious message every three weeks, i.e., at least once during the certificate lifetime.

More effort is needed to determine how best to mitigate this mode of attack. However, there is one readily-identifiable countermeasure. It is recognized that the short-lived, unlinked certificate scheme does permit the Assigning Certificate Authority 12 to retain some knowledge about the association among certificates. This knowledge is limited to the grouping of certificates that were requested in a single transaction. Once certificate misuse is detected, a search can be conducted by the Assigning Certificate Authority 12 to locate the other certificates that were supplied to the vehicle as part of the certificate batch. Because each certificate is unique to a vehicle 14, a determination that one certificate in a batch has been misused is sufficient to designate that all certificates supplied in the batch have been compromised. If a vehicle 14 attempts to surrender any one of the certificates from the batch, the Assigning Certificate Authority 12 will recognize the vehicle 14 as an attacker, deny the request, and lock-out the vehicle 14.

The above mitigation technique helps to reduce the length of time that an attacker can operate, but does not completely eliminate the vulnerability. An attacker can still exploit the sequential use of certificates. Rather than sequentially using a single certificate, the attacker could sequentially use batches of certificates. The rationale is that since one certificate is sufficient to identify the batch as being compromised, the attacker might as well use all certificates in the batch to spread the attack across multiple certificates and reduce the chance of detection. An attacker would need to keep track of how each batch of certificates was acquired and judiciously use each batch. In this case, the total time to exhaust a set of n certificates is about:

$$B*(c_{lifetime} + t_{spreading}) \qquad \text{Eqn 3}$$

where:

B is the number of certificates batches $c_{lifetime}$ is the lifetime of a certificate If each vehicle has 100 certificates that were acquired in ten batches and the certificate lifetime is two weeks with a spreading time of one week, the total time that an attacker can operate is about 3*10=30 weeks.

It may also be possible for the Authorizing Certificate Authority 10 to detect a "Sequential Certificate Use" attack by observing the number of certificates requested (w) over time. If a particular vehicle 14 continues to rekey, i.e., has not gone silent, but requests fewer total certificates over consecutive certificate lifetime intervals, the vehicle 14 can be suspected of implementing a "Sequential Certificate Use" attack. This approach could be very effective, but it must not falsely mistake a vehicle 14 that has been silent for a period of time as an attacker. Several certificate cycles are probably necessary to make an accurate determination. The time needed to detect and disable a misbehaving vehicle is:

$$K*(c_{lifetime} + t_{spreading}) \qquad \text{Eqn 4}$$

where:

K is the number of certificate lifetime cycles $c_{lifetime}$ is the lifetime of a certificate This approach makes the attacker's lifetime independent of the number of certificates it possesses and removes the need to track certificate batches. If the number of certificate cycles that must be observed is five and the certificate lifetime is two weeks with a spreading time of one week, the total time that an attacker can operate is about 3*5=15 weeks.

Analysis of Potential Issues and Forms of Attacks

The short-lived, unlinked certificate scheme can be subjected to several different forms of attack, discussed in detail below. Some are unique to the short-lived, unlinked certificate scheme. Others apply to both the short-lived, unlinked certificate and shared certificate schemes. In some cases, the short-lived, unlinked certificate scheme is immune to an attack, but the shared certificate schemes are vulnerable. Suggested mitigation measures are described where known.

Surrendered Certificate Database Performance

The short-lived, unlinked certificate scheme must protect against an attack where a certificate not associated with malicious behavior is surrendered more than once either by the same vehicle or multiple vehicles to "prove innocence" and acquire a replacement certificate. The method or mitigation measure suggested at present is to maintain a database of all certificates that have been surrendered by all vehicles. A concern with this approach is the size and practicality of such a database. To estimate the size of the Surrendered Certificate Database 26, assume the following system parameters:

Each vehicle has 100 certificates, i.e., n=100
Each vehicle uses 10 batches to acquire 100 certificates
Each certificate expires in 2 weeks
There are 200 million vehicles in the vehicle network system
Certificates in the Surrendered Certificate Database 26 are deleted after two years.

Based on the above system parameters, the Surrendered Certificate Database 26 would need to make an entry for:

$$2*(200\times10^6*100*52/2)=1.04\times10^{12} \text{ certificates} \quad \text{Eqn 5}$$

If there are 100 Surrendered Certificate Databases distributed throughout the entire country, e.g., two for each state, each database would contain 10 billion certificate entries, which makes for a very large database.

In addition, the number of certificate replacement transactions per year would be:

$$10*(200\times10^6*100*52/2)=5.2\times10^{12} \text{ certificate replacement trans.} \quad \text{Eqn 6}$$

If there are 100 Surrendered Certificate Databases, each database would need to process about 1650 certificate replacement transactions/second. As a point of reference, in 2006, an individual Domain Name Service (DNS) server proposed for the .org top level domain has a capacity of about 5,000 queries/sec.

Sequential Certificate Use Attack

The short-lived, unlinked certificate scheme is susceptible to "Sequential Certificate Use" attacks as described above. To implement this attack, an attacker uses one or only a small number of certificates to attack and stores the remainder of the certificates. When the certificates expire, the attacker requests replacements, but surrenders only the expired stored certificates. The attacker then repeats the process. The result is that the attacker's cache of certificates constantly decreases, but its ability to operate becomes a multiple of the certificate lifetime.

The method described above, where the Authorizing Certificate Authority 10 observes the number of certificates requested (w) over time and detects vehicles that are consistently requesting fewer total certificates, addresses this attack to some extent and limits the attacker's lifetime to about fifteen weeks. The method of associating misused certificates with a certificate batch and placing all certificates in the batch on the misused certificate list may further reduce an attacker's lifetime.

Message Flooding Attack

The short-lived, unlinked certificate scheme makes the vehicle network system vulnerable to message flooding attacks where an attacker uses one or more valid certificates to generate a large number of malicious messages. Because there is no CRL, even if a certificate is identified as being misused, an attacker can continue to generate malicious messages with valid certificates. The messages will be interpreted by other vehicles and RSEs as legitimate until the attacker's certificates expire. The lack of a CRL has the disadvantage of providing an attacker with a period of time during which the vehicle network system cannot disable them from inserting malicious messages into the system. In the shared certificate schemes, by contrast, certificates can be revoked on the CRL. If the attacker persists and continues to flood malicious messages using another certificate, this has the effect of more quickly helping the system to identify the attacker. The time to identify and disable the attacker can be quite short because the average detection delay ($t_d$) is short.

The message flooding attack might be tolerable in the short-lived, unlinked certificate scheme if the period of time that an attacker can generate malicious messages with valid certificates is fairly short. However, when the "Message Flooding" attack is combined with the "Sequential Certificate Use" attack, an attacker can continue to operate for many weeks, depending upon system parameters. As stated above, the time it takes for an attacker to be eliminated could be up to fifteen weeks.

As a potential mitigation, the use of CRLs, or the lack thereof, can be treated separately for vehicle-to-vehicle and vehicle-to-infrastructure communication. The constraint with unique certificates is that CRLs can very quickly grow quite large. This aspect makes it less practical to transfer them over the air-link to every vehicle, as well as requiring each vehicle to store and process large CRLs. However, there may be less of a constraint on transferring and processing large CRLs at the RSE. There are significantly fewer RSEs/access points and each has a reliable and high bandwidth connection to the vehicle network infrastructure. Given these facts, it may be possible for a CRL to be regularly distributed to only RSEs to mitigate message flooding attacks on vehicle-to-infrastructure communications.

Another potential mitigation is to publish an emergency CRL to vehicles, but only revoke certificates that are causing significant disruption to the system to keep the CRL short. A message flooding attack might be one of a limited number of attacks that merit revoking certificates to more quickly eliminate attackers. Other less disruptive attacks would not trigger certificate revocation, but rather would rely upon certificate expiration to purge attackers. Since certificate life times are short, the emergency CRL quickly decreases in length.

Certificate/Key Mining Attack

Certificate schemes that store a large number of certificates on each vehicle, such as the short-lived, unlinked certificate scheme, are vulnerable to attacks where certificate and key information are mined from vehicles in salvage yards. An attacker that successfully compromises a vehicle in a salvage yard would have access to a significant number of certificates in the short-lived, unlinked certificate scheme. Even though it is likely that the certificates will have expired by the time the attacker recovers them from the salvage yard, each expired certificate can be used to obtain a fresh replacement because it is unlikely that the recovered certificates will be on the list of misused certificates or already be in the Surrendered Certificate Database 26. By compromising a vehicle in the salvage yard and combining this exploit with the "Sequential Certificate Use" attack, an attacker will be able to conduct malicious behavior for several weeks or months before being disabled.

Two authorization checks in the Authorizing Certificate Authority 10 help to curb certain aspects of this attack. First, it would be advantageous for salvaged vehicles to be reported to the Authorizing Certificate Authority 10 so that any attempt to request replacement certificates using the long term identifying certificate of a salvaged vehicle would be denied. Second, a check for excessive rekeying activity could detect and stop attackers that have recovered certificates from one or more salvaged vehicles and are attempting to obtain a mass certificate replacement. However, neither check curbs an attack where an attacker recovers certificates from a salvaged vehicle, uses the identifying certificate of an active vehicle, and slowly replaces expired certificates or subsequently implements the "Sequential Certificate Use" attack.

Shared certificate schemes are also vulnerable to certificate mining attacks. In the case where an anonymous identifier is used to track misused certificate counts by vehicle, the insertion of a few certificates from a salvaged vehicle would impair attacker detection and increase the error rate of incorrectly identifying an innocent vehicle as an attacker. In the case where the set of potential suspect vehicles is narrowed by intelligent rekeying, the insertion of a few certificates from a salvaged vehicle would essentially have the same effect.

Expiration of Certificates in Areas with Low RSE Coverage

The short-lived, unlinked certificate scheme requires vehicles to periodically enter areas with RSE coverage at intervals approximately equal to the certificate lifetime. If a vehicle happens to be outside of RSE coverage and all of its certificates expire, it will be unable to sign messages and will become a passive participant in the VII system.

Based on the anticipated deployment of the VII system, as discussed in US Department of Transportation, A VII Deployment Scenario, Dec. 22, 2005, William S. Jones, vehicles should be within two minutes of RSE coverage in urban environments and within ten minutes in rural environments. Under this deployment plan, certificate lifetimes on the order of several weeks should not pose a problem. In addition, certificates in the short-lived, unlinked certificate scheme do not all expire at the same time because they were not all acquired at the same time. The spreading period ($t_{spreading}$), which is necessary to prevent the Assigning Certificate Authority 12 from associating batches of certificates for a particular vehicle 14, disperses the expiration dates of the certificates. The total time before a vehicle 14 runs out of fresh certificates is the sum of the certificate lifetime plus the spreading period ($t_{spreading}$). If the certificate lifetime is two weeks and the spreading period is one week, the total time that a vehicle could be without communication with an RSE is more than three weeks.

There is a potential problem, however, in the event that all certificates on a vehicle do expire. The vehicle would be left without a valid certificate to sign messages. To conduct the certificate replacement transaction, the vehicle may need at least one valid certificate to sign the transaction messages. This situation also occurs during the vehicle initialization stage if the vehicle obtains its first set of certificates over the air. It is not unique to the short-lived, unlinked certificate method. Any scheme that uses certificates with expiration dates will need to provide a solution for this scenario.

Collusion between Authorizing and Assigning Certificate Authorities

The short-lived, unlinked certificate scheme is susceptible to acts of collusion between the Authorizing 10 and Assigning Certificate Authority 12. This issue appears not to be limited to or any worse with the short-lived, unlinked certificate scheme than shared certificate schemes. In both cases, unique certificates can be assigned to a particular vehicle and the VII system can be used to track it. In the short-lived, unlinked scheme, the Authorizing Certificate Authority 10 could use its knowledge of the vehicle identity to allow the Assigning Certificate Authority 12 to build associations among the certificates that are provided to a particular vehicle. Once the Assigning Certificate Authority 12 has constructed a list of unique certificate for a particular vehicle 14, the VII system can monitor and filter messages using those certificates.

Shared certificates schemes offer no real advantage against this attack. If the Authorizing and Assigning Certificate Authority were to collude, the most convenient attack would be for the Assigning Certificate Authority to assign the target vehicle a unique set of certificates so that it becomes clearly visible in the VII system. Also, although many vehicles across the entire system share the same certificates, it has been shown that in areas with low to moderate vehicle density, each vehicle essentially has a unique certificate. The only difference between the short-lived, unlinked certificate and shared certificate schemes is that it might take a little longer to enable the surveillance of a target vehicle in the shared certificate schemes because the certificates used by the target vehicle would either have to expire or be revoked. The certificate lifetime in the shared certificate schemes is likely to be longer than in the short-lived, unlinked certificate scheme.

Attacks Involving the Exchange of Certificates/Keys

The short-lived, unlinked certificate scheme is immune to attacks where compromised certificates and key are exchanged among two or more attackers, unlike prior art systems. The short-lived, unlinked certificate scheme does not keep track of the certificates that belong to a particular vehicle, even if the vehicle is anonymous. The short-lived scheme functions primarily on the basis of determining whether individual certificates have been misused. The exchange of certificates/keys among attackers might actually cause attackers to be eliminated more quickly in the short-lived, unlinked certificate scheme. The involvement of multiple attackers may result in less strict usage of certificates according to rules that would maximize certificate replacement and attacker lifetime. Shared certificate schemes that use an anonymous identifier for each vehicle or require geographic proof of innocence are susceptible to attacks involving the exchange of certificates/keys across regions.

In summary, the short-lived, unlinked certificate scheme provides several advantages over prior art methods:
  No "one affects many" Problem
  Less Sensitive to the Number of Attackers or the Attack Rate (which are unknown quantities)
  Low Rate of Mistaking an Innocent Vehicle for an Attacker
  Immune to Attacks involving the Exchange of Certificates/Keys
  Removal of Attackers is more Straightforward
  Supports Regional Deployment with Local Parameters
  Does Not Require Regional Deployment in a Large System
  System can be "throttled" based on Malicious Activity
  CRLs are not Ordinarily Published (or they are published as an empty list)
  Simplicity aids Implementation and System Operation While the present invention has been described in particular embodiments, it should be appreciated that the present invention should not be construed as limited by such embodiments, but rather construed according to the claims below.

What is claimed is:

1. A method for management of cryptographic keys and certificates for a plurality of vehicles, said method comprising steps of:
for a vehicle of said plurality of vehicles:
generating public/private key pairs;
requesting a plurality of time-distributed certificates;
creating and presenting an encrypted identity; and
surrendering expired certificates equal in number to the plurality of time-distributed certificates requested;
for an assigning authority:
receiving said public/private key pairs, said request for time-distributed certificates, said encrypted identity, and said expired certificates from said vehicle;
authorizing said vehicle with an authorizing authority;
validating said expired certificates;
proving ownership of said surrendered expired certificates by said vehicle; and
distributing said requested time-distributed certificates equal in number to the number of surrendered expired certificates to said vehicle.

2. The method according to claim 1, said step of validating comprising checking said expired certificates for misused certificates, compromised certificates, and previously surrendered certificates.

3. The method according to claim 1, wherein said encrypted identity comprises one of a timestamp and a nonce, and a temporal value.

4. The method according to claim 1, wherein said step of requesting comprises requesting a plurality of requests distributed over a spreading period of time having randomized intervals between two of said plurality of requests.

5. The method according to claim 4, wherein said time-distributed certificates requested in each of said plurality of requests are a random number of certificates.

6. The method according to claim 1, wherein said time-distributed certificates comprise lifetimes.

7. The method according to claim 6, wherein said lifetimes are adjustable based on at least one of a certificate misuse detection system algorithms, an amount of malicious activity detected, and certificate authority capacity.

8. A non-transitory computer readable medium having computer readable program code for operating on a computer for management of cryptographic keys and certificates for a plurality of vehicles, comprising:
for a vehicle of said plurality of vehicles:
generating public/private key pairs;
requesting a plurality of time-distributed certificates;
creating and presenting an encrypted identity; and
surrendering expired certificates equal in number to the plurality of time-distributed certificates requested;
for an assigning authority:
receiving said public/private key pairs, said request for time-distributed certificates, said encrypted identity, and said expired certificates from said vehicle;
authorizing said vehicle with an authorizing authority;
validating said expired certificates;
proving ownership of said surrendered expired certificates by said vehicle; and
distributing said requested time-distributed certificates equal in number to the number of surrendered expired certificates to said vehicle.

9. The non-transitory computer readable medium according to claim 8, said step of validating comprising checking said expired certificates for misused certificates, compromised certificates, and previously surrendered certificates.

10. The non-transitory computer readable medium according to claim 8, wherein said encrypted identity comprises one of a timestamp and a nonce, and a temporal value.

11. The non-transitory computer readable medium according to claim 8, wherein said step of requesting comprises requesting a plurality of requests distributed over a spreading period of time having randomized intervals between two of said plurality of requests.

12. The non-transitory computer readable medium according to claim 11, wherein said time-distributed certificates requested in each of said plurality of requests are a random number of certificates.

13. The non-transitory computer readable medium according to claim 8, wherein said time-distributed certificates comprise lifetimes.

14. The non-transitory computer readable medium according to claim 13, wherein said lifetimes are adjustable based on at least one of a certificate misuse detection system algorithms, an amount of malicious activity detected, and certificate authority capacity.

15. A system for management of cryptographic keys and certificates for a plurality of vehicles, comprising:
a vehicle of said plurality of vehicles, said vehicle operable to generate public/private key pairs, request a plurality of time-distributed certificates, create an encrypted identity, and surrender expired certificates equal in number to the plurality of time-distributed certificates requested;
an assigning authority hardware device operable to receive said public/private key pairs, said request for time-distributed certificates, said encrypted identity, and said expired certificates from said vehicle; and
an authorizing authority hardware device operable to authorize said vehicle based on said encrypted identity,
wherein when said authorizing authority hardware device authorizes said vehicle, said assigning authority hardware device validates said expired certificates, proves ownership of said surrendered expired certificates by said vehicle, and distributes said time-distributed certificates equal in number to the number of surrendered expired certificates to said vehicle.

16. The system according to claim 15, said assigning authority hardware device validates said expired certificates comprises checking said expired certificates for misused certificates, compromised certificates, and previously surrendered certificates.

17. The system according to claim 15, wherein said encrypted identity comprises one of a timestamp and a nonce, and a temporal value.

18. The system according to claim 15, wherein said request for a plurality of time-distributed certificates comprises a plurality of requests distributed over a spreading period of time having randomized intervals between two of said plurality of requests.

19. The system according to claim 18, wherein said time-distributed certificates requested in each of said plurality of requests are a random number of certificates.

20. The system according to claim 15, wherein said time-distributed certificates comprise lifetimes adjustable based on at least one of a certificate misuse detection system algorithms, an amount of malicious activity detected, and certificate authority capacity.

* * * * *